US011155719B2

(12) United States Patent
Gregg et al.

(10) Patent No.: US 11,155,719 B2
(45) Date of Patent: Oct. 26, 2021

(54) REMOVABLE, AQUEOUS-BASED COMPOSITIONS

(71) Applicant: DAP Products Inc., Baltimore, MD (US)

(72) Inventors: Kristin Mihalcik Gregg, Glen Burnie, MD (US); Michael Chronister, Baltimore, MD (US)

(73) Assignee: DAP Products Inc., Baltimore, MD (US)

( * ) Notice: Subject to any disclaimer, the term of this patent is extended or adjusted under 35 U.S.C. 154(b) by 193 days.

(21) Appl. No.: 15/251,864

(22) Filed: Aug. 30, 2016

(65) Prior Publication Data
US 2017/0226348 A1 Aug. 10, 2017

Related U.S. Application Data

(60) Provisional application No. 62/293,363, filed on Feb. 10, 2016.

(51) Int. Cl.
| | | |
|---|---|---|
| *C09D 133/08* | (2006.01) |
| *C09D 133/12* | (2006.01) |
| *C09D 5/00* | (2006.01) |
| *C09D 131/02* | (2006.01) |
| *B29C 65/70* | (2006.01) |
| *B29C 67/24* | (2006.01) |
| *C09D 5/34* | (2006.01) |
| *C09D 109/00* | (2006.01) |
| *C09D 125/10* | (2006.01) |
| *C09D 131/04* | (2006.01) |
| *C09D 133/20* | (2006.01) |

(52) U.S. Cl.
CPC .............. *C09D 5/008* (2013.01); *B29C 65/70* (2013.01); *B29C 67/24* (2013.01); *C09D 5/34* (2013.01); *C09D 109/00* (2013.01); *C09D 125/10* (2013.01); *C09D 131/02* (2013.01); *C09D 131/04* (2013.01); *C09D 133/08* (2013.01); *C09D 133/12* (2013.01); *C09D 133/20* (2013.01); *B29K 2995/0026* (2013.01)

(58) Field of Classification Search
CPC .. C09D 133/08; C09D 133/12; C09D 133/20; C09D 131/02; C09D 131/04; C09D 125/10; C09D 109/00; C09D 5/008; C09D 5/34
See application file for complete search history.

(56) References Cited

U.S. PATENT DOCUMENTS

| | | | |
|---|---|---|---|
| 4,077,932 A | 3/1978 | Columbus | |
| 4,912,169 A | 3/1990 | Whitmire et al. | |
| 5,143,949 A | 9/1992 | Grogan et al. | |
| 6,001,912 A * | 12/1999 | Schneider | ............ C08K 5/0008 523/122 |
| 6,066,688 A | 5/2000 | Samonides, Sr. | |
| 8,263,231 B2 | 9/2012 | Mesa | |
| 8,263,323 B2 | 9/2012 | Yoon et al. | |
| 2002/0016406 A1* | 2/2002 | Chen | ...................... C09J 133/08 524/502 |
| 2007/0110966 A1* | 5/2007 | Warren | ................. B44C 1/1754 428/195.1 |
| 2011/0034621 A1* | 2/2011 | Demarest | ............... C09J 133/14 524/547 |
| 2011/0046296 A1* | 2/2011 | Morino | .................. C09J 133/08 524/555 |
| 2011/0144247 A1 | 6/2011 | Campbell et al. | |
| 2011/0168332 A1 | 7/2011 | Bowe et al. | |
| 2012/0077030 A1* | 3/2012 | Gerst | .................... C08F 265/02 428/355 AC |
| 2012/0219795 A1 | 8/2012 | Mitsui et al. | |
| 2013/0040137 A1* | 2/2013 | Morimoto | .............. C09J 133/10 428/355 CN |
| 2014/0272408 A1* | 9/2014 | Amano | .................. C09J 133/26 428/355 AC |
| 2016/0194505 A1* | 7/2016 | Lau | ....................... C08F 220/18 524/507 |

FOREIGN PATENT DOCUMENTS

| | | | |
|---|---|---|---|
| JP | 2004203997 A | * | 7/2004 |
| JP | 2004203997 A | | 7/2004 |
| WO | WO-2014//099575 A1 | * | 6/2014 |
| WO | 20150041034 A1 | | 3/2015 |
| WO | 20150041035 A1 | | 3/2015 |

OTHER PUBLICATIONS

The machine translation into English of JP 2004-203997 A; Fujiwara et al; Jul. 2004.*
International Search Report and Written Opinion were dated Mar. 31, 2017 by the International Searching Authority for International Application No. PCT/US2017/012733, which was filed on Jan. 9, 2017(Applicant-Dap Products, Inc.) (9 pages).
"Chemistry of Pressure-sensitive adhesive," Wikipedia article retrieved on Jan. 4, 2016 // Last Modified on Nov. 13, 2015, available at https://en.wikipedia.org/w/index.php?title=Chemistryof_pressuresensitive_adhesives&oldid=690497 512 (8 pages).
"Pressure-sensitive adhesive," Wikipedia article retrieved on Jan. 4, 2016 // Last Modified on Oct. 11, 2015, available at https://en.wikipedia.org/w/index.php?title=Pressuresensitive _adhesive&oldid= 685193634 (4 pages).
"Pressure-Sensitive Adhesives," Avery Dennison product brochure, available at http://label.averydennison.co.za/content/dam/averydennison/lpm/na/en/doc/home/resource%20center/Adhesive%20Overview(1).pdf, 2011 (12 pages).
"Repositionable Adhesives," Franklin Adhesives and Polymers—Product Description, Retrieved on Jan. 6, 2016, Available on http://www.franklinadhesivesandpolymers.com/Pressure-Sensitive-Adhesives-Worldwide (2 pages).

(Continued)

*Primary Examiner* — Karuna P Reddy
(74) *Attorney, Agent, or Firm* — Armstrong Teasdale LLP

(57) ABSTRACT

Removable, aqueous-based compositions, especially sealants useful for, inter alia, temporary craft applications and seasonal weatherization of buildings and methods of their use are disclosed. These sealants reduce the flammability risks and lingering odor problems associated using solvent-based systems, particularly during application. These compositions do not rely on additives that disrupt the adhesion of the compositions to the substrate and that leave undesirable residue on the substrate.

19 Claims, No Drawings

(56) References Cited

OTHER PUBLICATIONS

"ROBOND PS-1049 Removable Water-Based Acrylic Adhesive—Description and Features," Dow Chemical Company product description, issued in Jan. 2008 (2 pages).
"ROBOND PS-8061," Dow Chemical Company product description, issued in Oct. 2009 (2 pages).
"ROBOND PS-8120 HV," Rohm and Haas Pressure Sensitive Adhesives, product description sheet issued in 2006 (2 pages).
"Sealant," Wikipedia article retrieved on Jan. 4, 2016 // Last Modified on Oct. 27, 2015, available at https://en.wikipedia.org/w/index.php?title=Sealant&oldid=687702146 (4 pages).
"Service Life Prediction of Sealant Materials Consortium," NIST Article, Date Created: Jul. 29, 2011 // Last Updated: Oct. 21, 2011 // Retrieved on Nov. 24, 2015, available at http://www.nist.gov/ ellbuilding materials/polvmeric-materials/sealantcosort2.cfm (4 pages).
"Water-Based Acrylic Pressure-Sensitive Removable Adhesives," Dow Chemical Company Product Safety Assessment issued on Jul. 2, 2013 (6 pages).
"Zip-A-Way Removable Sealant—Solvent Based—Clear," Red Devil product Safety Data Sheet, issued on Aug. 29, 2013 // Last Revised Sep. 25, 2013 (11 pages).
"Zip-A-Way Removable Weather Strip Sealant—Product No. 0606," Red Devil Technical Data Sheet, issued on Dec. 2, 2009 (2 pages).
Divnova Specialties PVT., LTD., Product Descriptions, created in 2008, available at http://www.divnova.com/packaging.htm, Retrieved on Nov. 24, 2015 (4 pages).

\* cited by examiner

REMOVABLE, AQUEOUS-BASED COMPOSITIONS

CROSS REFERENCE TO RELATED APPLICATIONS

This application claims the benefit of U.S. Application No. 62/293,363 filed Feb. 10, 2016, the entire disclosure of which is incorporated herein by reference.

FIELD OF THE INVENTION

The invention relates to aqueous polymeric compositions. More particularly, the invention relates to removable, aqueous-based polymeric compositions useful for temporary or removable applications.

BACKGROUND OF THE INVENTION

A number of applications require the use of a material that makes contact between substrates, for example to fill a gap or form a bead, but which can be removed without damaging the surface of the substrates and without leaving a residue on the substrates. One such application includes craft items, especially those used for decorative purposes and those used by children, especially where the substrate can be easily damaged, such as paper or painted walls. Another application includes the use as a building material, especially one used in temporary weatherization.

Weatherization is the practice of protecting a building and its interior from the elements, particularly from sunlight, precipitation, and wind, and of modifying a building to reduce energy consumption and optimize energy efficiency. Such protection may involve the use of building materials to prevent the passage of air and water through the gaps surrounding building openings, such as windows, doors, and attic and basement entries, and pipes and wiring that penetrate the walls, ceiling, and floor. For example, air leaks into and out of buildings, such as residences, hospitals, churches, and commercial buildings, in all seasons. Hot summer air that leaks into buildings through cracks, gaps, and worn weather stripping, causes air conditioning units to run longer to compensate for the increased inside temperature, thereby increasing utility costs. During cold winter months, heat seeps out of buildings through the same openings, driving up the cost of keeping the space warm. Thus, weatherization to prevent these leaks is a maintenance practice that would pay off year round. However, developing suitable materials for use in weatherization can be difficult.

For some applications, it is important to be able to cleanly remove the building material used for weatherization, such as to open, clean, or repair a window, without causing damage to the underlying substrates, such as a painted window sill, sash, or frame, and without leaving any residual material on the substrates.

From an environmental and safety perspective, weatherization products are preferably aqueous based. However, developing such products can negatively impact the application and performance properties of the products.

Furthermore, filling gaps surrounding a building opening can be difficult from a materials perspective because the gap dimensions constantly change due to changes and cycling in the environmental conditions (such as temperature, humidity, wind, etc.). Moreover, the problem is exacerbated by differing thermal coefficients of expansion and/or elongation under stress between dissimilar substrates (such as painted wood, metal, and glass in a window pane or sash), which lead to inconsistent gap distances.

For aesthetic reasons, it is preferred that the building material is not noticeable, when it is dry. Moreover, for safety reasons, it may be important that the building material used for the weatherization dries substantially clear and colorless, so that it does not impair the visual path, especially for window and door applications.

Thus, there is an ongoing need for building materials that serve a weatherization function and which are removable, aqueous based, remove cleanly without leaving a residue on the underlying substrates, work to fill gaps on a variety of substrate, and preferably dry clear and colorless. The present invention is directed to these, as well as other, important needs.

SUMMARY OF THE INVENTION

Removable, aqueous-based compositions, especially sealants useful for, inter alia, temporary craft and seasonal weatherization of buildings, are provided by the present invention. These sealants reduce the flammability risks and lingering odor problems associated using solvent-based systems, particularly during application. These sealants do not rely on additives that disrupt the adhesion of the sealants to the substrate and that leave undesirable residue on the substrate.

Accordingly, in one aspect, the invention is directed compositions, comprising:

at least one polymer selected from the group consisting of acrylic polymer, acrylic-acrylonitrile polymer, polyvinyl butyral, polyisoprene, vinyl acrylic polymer, ethylene-vinyl acetate (EVA) polymer, vinyl acetate-ethylene-acrylic polymer, natural rubber, synthetic thermoplastic elastomer, silicone rubber, styrene-butadiene polymer, and mixtures thereof;

wherein said polymer has a glass transition temperature less than about −20° C. and a weight-average molecular weight of at least 35,000 Daltons;

optionally, at least one crosslinking agent;

water; and less than about 5% by weight, based on the total weight of said composition, of organic solvent;

less than about 1% by weight, based on the total weight of said composition, of release agents selected from the group consisting of oil, plasticizer, and mixtures thereof; and wherein said composition is removable after said composition is fully dry.

In another aspect, the invention is directed to methods of removably sealing a gap between at least two substrates, comprising:

applying said composition described herein to said gap; and permitting said composition to dry;

wherein said gap is about 3 mm to about 15 mm; and wherein said composition is removable after said composition is fully dry.

In yet other aspects, the invention is directed to methods of forming a removable bead on a substrate, comprising:

applying a bead of said composition described herein to said substrate; and permitting said composition to dry;

wherein said bead is about 3 mm to about 15 mm; and wherein said composition is removable after said composition is fully dry.

DETAILED DESCRIPTION OF THE INVENTION

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. That is, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As employed above and throughout the disclosure, the following terms, unless otherwise indicated, shall be understood to have the following meanings.

As used herein, the singular forms "a," "an," and "the" include the plural reference unless the context clearly indicates otherwise.

As used herein, the term "sealant" refers to a substance used to block the passage of fluids (including air and moisture), particulates (including pests, dust, and pollen), light, and/or sound through the surface or joints or openings in materials, particularly building materials. A sealant fills a gap between two or more substrates, forming an elastic barrier through the physical properties of the sealant itself and by adhesion to the substrates, which is maintained for the expected lifetime, service conditions, and/or environments to which the sealant is subjected. The gap is typically about 3 mm to about 15 mm.

As used herein, the term "bead" refers to both a single, small deposit of the composition or a substantially continuous line (of any shape) of the composition.

As used herein, the term "removable" means the ability of the user to remove the composition by hand (i.e., as measured by peel strength on painted wood after fully dry (typically about one week after application depending upon ambient temperature and humidity) should be in the range of 0.45-10.0 lbs/inch (for a sealant at thickness of about 3 mm to about 15 mm)) and/or with a tool without damaging the substrates between which the composition has been applied and without leaving any residue on the substrates (i.e., fail by substantially 100% interfacial failure at a low peel strength).

As used herein, the term "substantially clear" means the dried composition applied to a black standard substrate has a CIE $\Delta L$ (light/dark) value of less than about 20, preferably less than about 18.5, when measured by on a spectrophotometer compared to the black substrate.

As used herein, the term "substantially colorless" means the dried composition applied to a standard white substrate has a CIE $\Delta b$ (yellow/blue) value of less than about 1.5, preferably less than about 1.2, when measured by on a spectrophotometer compared to the white substrate.

As used herein, the term "glass transition temperature" or "$T_g$" refers to the reversible transition in amorphous materials (or in amorphous regions within semicrystalline materials) from a hard and relatively brittle glassy state into a molten or rubber-like state, as the temperature is increased, as measured by differential scanning calorimetry (DSC) taking the mid-point in the heat flow versus temperature transition as the $T_g$ value.

As used herein, the term "weight-average molecular weight" ($M_w$) is defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to number-average molecular weight, $M_w$ takes into account the molecular weight of a given chain in determining contributions to the molecular weight-average. Thus, the greater the molecular weight of a given chain, the more the chain contributes to the $M_w$. $M_w$ may be determined for polymers by methods well known in the art using molecular weight standards, e.g., polycarbonate standards, polystyrene, or poly(methyl methacrylate) standards, preferably certified or traceable molecular weight standards, using gel permeation chromatography.

As used herein, the term "(meth)acrylic acid" refers to both acrylic acid and methacrylic acid.

Accordingly, in one aspect, the invention is directed to compositions, comprising:

at least one polymer selected from the group consisting of acrylic polymer, acrylic-acrylonitrile polymer, polyvinyl butyral, polyisoprene, vinyl acrylic polymer, ethylene-vinyl acetate (EVA) polymer, vinyl acetate-ethylene-acrylic polymer, natural rubber, synthetic thermoplastic elastomer, silicone rubber, styrene-butadiene polymer, and mixtures thereof;

wherein said polymer has a glass transition temperature less than about −20° C. and a weight-average molecular weight of at least 35,000 Daltons;

optionally, at least one crosslinking agent;

water; and less than about 5% by weight, based on the total weight of said composition, of organic solvent;

less than about 1% by weight, based on the total weight of said composition, of release agents selected from the group consisting of oil, plasticizer, and mixtures thereof; and wherein said composition is removable after said composition is fully dry.

In preferred embodiments, the polymer is an emulsion polymer.

Suitable acrylic polymers include, but are not limited to acrylate and methacrylate homopolymers and copolymers, such as vinyl acrylics and acrylate-methacrylate copolymers. The polymers and copolymers may contain other monomers, including monoethylenically-unsaturated carboxylic acid monomer, such as, for example, (meth)acrylic acid, crotonic acid, itaconic acid, fumaric acid, maleic acid, monomethyl itaconate, monomethyl fumarate, monobutyl fumarate, and maleic anhydride.

Suitable synthetic thermoplastic elastomers include, but are not limited to polyurethane, chloroprene, butyl rubber, nitrile rubber, polybutadiene, isoprene, neoprene, styrene block copolymer (such as styrene-butadiene-styrene (SBS), styrene ethylene/butylene-styrene (SEBS), styrene-ethylene/propylene (SEP), and styrene-isoprene-styrene (SIS) and the like.

Suitable silicone polymers include, but are not limited to polydialkylsiloxanes, such as polydimethylsiloxane and polydiethylsiloxane, and polyarylsiloxanes.

In certain embodiments, the polymer may be present in the composition at a level of about 30% by weight to about 99% by weight, based on the weight of the composition before drying. In other embodiments, the polymer may be present at a level of about 40% by weight to about 80% by weight, based on the weight of the composition before drying.

In certain embodiments, the polymer has a glass transition temperature of about $-70°$ C. to about $-20°$ C. In other embodiments, the polymer has a glass transition temperature of $-50°$ C. to about $-20°$ C. In another embodiment, the polymer has a glass transition temperature of $-40°$ C. to about $-20°$ C. In yet other embodiments, the polymer has a glass transition temperature of $-35°$ C. to about $-20°$ C.

In certain embodiments, the polymer has a weight-average molecular weight of about 50,000 Daltons to about 2,500,000 Daltons, preferably 50,000 Daltons to about 1,500,000 Daltons.

In certain embodiments, the polymer is crosslinkable or crosslinked. In certain embodiments of the composition, an external crosslinking agent is present. In certain embodiments, the external crosslinking agent may be an aziridine, an isocyanate, or a carbodiimide (such as an aryl polycarbodiimide. The external crosslinking agent may present a level of about 0.1% by weight to about 5% by weight, preferably, about 1% by to about 5% by weight, based on weight of polymer. In certain embodiments, the polymer is crosslinked internally by use of multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, divinyl benzene, and), or a maleate of the formula:

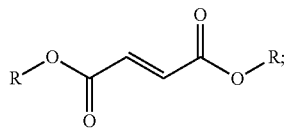

wherein R is independently selected from vinyl ($-HC=CH_2$), allyl ($-CH_2-CH=CH_2$), or methallyl ($-C(-CH_2)=CH_2$). The internal crosslinking agent may be present in the polymer at a level of from 0% to about 1.5%, by weight based on total monomer weight.

In certain embodiments, the polymer is not a light-cured thermosetting polymer.

In certain embodiments, the polymer is a copolymer of at least one ethylenically unsaturated monomer selected from the group consisting of (meth)acrylic acid; acrylic esters; styrene; vinyl ether; vinyl ester (such as, for example, vinyl versatate); vinyl halide; vinylidene halide; N-vinyl pyrrolidone; ethylene; $C_3$ or greater alpha-olefin; allyl amine; allyl ester of saturated monocarboxylic acids and amides thereof; propylene; 1-butene; 1-pentene; 1-hexene; 1-decene; allyl amine; allyl acetate; allyl propionate; allyl lactate and amides thereof; isobutylene, 1,3 butadiene; 2-methyl-1,3-butadiene; 2-chlorobuta-1,3-diene; 1,3-pentadiene; 1,4-pentadiene; cyclopentadiene; hexadiene isomers; and mixtures thereof.

In certain embodiments, the polymer is an acrylic polymer. In other embodiments, the polymer is a copolymer comprising butyl acrylate, methyl methacrylate, (meth)acrylic acid and, optionally, ethylhexyl acrylate. In other embodiments, the polymer is a copolymer comprising butyl acrylate, (meth)acrylic acid and, optionally, ethylhexyl acrylate and/or methyl methacrylate. In certain preferred embodiments, the polymer comprises about 60% by weight to about 80% by weight, based on the total weight of the polymer, of butyl acrylate, about 20% by weight to about 35% by weight methyl methacrylate, and 0.5% to 5% (meth)acrylic acid. In certain preferred embodiments, the polymer comprises about 60% by weight to about 80% by weight, based on the total weight of the polymer, of butyl acrylate, 20% by weight to about 35% by weight, based on the total weight of the polymer, of ethylhexyl acrylate, and about 0.5% by weight to about 5%, based on the total weight of the polymer, of (meth)acrylic acid. In certain preferred embodiments, the polymer comprises about 60% by weight to about 80% by weight, based on the total weight of the polymer, of butyl acrylate, 20% by weight to about 35% by weight, based on the total weight of the polymer, of ethylhexyl acrylate or methacrylate (or a mixture of the two monomers, whose total falls in the same range), and about 0.5% by weight to about 5% by weight, based on the total weight of the polymer, of (meth)acrylic acid. In yet other preferred embodiments, the polymer comprises about 40% by weight to about 95% by weight, based on the total weight of the polymer, of butyl acrylate; about 2% by weight to about 40% by weight, based on the total weight of the polymer, of methyl methacrylate; and about 0.2% by weight to about 10% by weight, based on the total weight of the polymer, of (meth)acrylic acid.

The compositions of the invention comprise less than about 5% by weight, based on the total weight of said composition, of organic solvent. For example, ethylene glycol (which also serves as an anti-freeze agent) may be present at a level of about 1% by weight to about 5% by weight, based on the total weight of the composition.

The compositions of the invention may further comprise optional additives or adjuvants. For example, the compositions may contain at least one of the following additives: rheology modifiers or thickeners; light stabilizers; surfactants; base for pH adjustment; anti-freeze agents, biocides; antifoaming agents; fire retardants; tackifiers; emulsifiers; coalescing agents; buffers; neutralizers; humectants; wetting agents. Pigments or colorants may be included, but are not preferred, especially for aesthetic and safety reasons. Similarly, plasticizers or waxes may be included, but are not preferred, since they could migrate from the composition and leave residue on the substrates after the sealant is removed.

In certain embodiments, the polymer comprises from about 0.2% to about 10%, by weight based on total monomer weight, of a copolymerized monoethylenically-unsaturated carboxylic acid monomer, based on the weight of the polymer, such as, for example, (meth)acrylic acid, crotonic acid, itaconic acid, fumaric acid, maleic acid, monomethyl itaconate, monomethyl fumarate, monobutyl fumarate, and maleic anhydride.

The polymerization techniques used to prepare aqueous emulsion-polymers useful in the compositions of the invention are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. However, after 90-99.7%, preferably 95-99.7%, of the monomers by weight, based on the total weight of the polymer, have been converted to polymer, at least half of the remaining monomer is converted to polymer in the presence of 0.1% to 1.0%, by weight based on the total weight of the polymer, of t-amyl hydroperoxide. This part of the reaction may be effected as soon as about 90% to about 99.7%, preferably about 95% to about 99.7%, conversion of the monomers to polymer is completed in the same reaction vessel or kettle. It may be effected after a period of time, in a different reaction vessel or kettle, or at a different temperature than the preceding part of the polymerization. Preferred is the presence of t-amyl hydroperoxide only after 90%, more preferably after 95%, conversion of the monomers to polymer is completed.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$-$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The average particle diameter of the emulsion-polymerized polymer particles is preferred to be from 30 nanometers to 500 nanometers, as measured by a BI-90 Particle Sizer.

The compositions are prepared by techniques which are well known in the sealant art. For example, the compositions are prepared in the laboratory using centrifugal mixing, double planetary mixing, or high speed dispersion with sweep. In full scale production, the sealant is processed using high speed dispersion and sweep. Generally, the latex polymer is added to the mixing vessel. Additives are blended into the latex polymer and then pH is adjusted. The last process step is typically a vacuum step to remove entrained air from the final composition.

The solids content of the composition may be from about 10% to about 85% by volume. The viscosity of the composition may be from 0.05 to 5000 Pa·s (50 cps to 5,000,000 cps), as measured using a Brookfield viscometer (T spindle; run at 0.5-10 rpm).

In certain embodiments, the composition is substantially clear when dry. In certain embodiments, the composition is substantially colorless when dry. In certain embodiments, the composition is white or colored when wet (before water evaporates from composition), but it is substantially clear and colorless when dry, which aids the user in accurate application.

The compositions of invention are removable after said compositions are fully dry (i.e., about the equilibrium moisture content of the ambient environment in which the compositions is used), which typically takes up to a week after application, depending upon bead size and ambient temperature and humidity conditions. In certain embodiments, the compositions of the invention are removable for at least about one month, preferably, for at least about six months, more preferably, for at least about nine months, and even more preferably for at least about twelve months, after application to a substrate.

In other embodiments, the invention is directed to dried sealants, comprising the removable composition described herein, wherein said dried sealant is substantially clear.

In another aspect, the invention is directed to methods of removably sealing a gap between at least two substrates, comprising:

applying said composition described herein to said gap; and permitting said composition to dry;

wherein said gap is about 3 mm to about 15 mm; and wherein said composition is removable after said composition is fully dry.

In yet other aspects, the invention is directed to methods of forming a removable bead on a substrate, comprising:

applying a bead of said composition described herein to said substrate; and permitting said composition to dry;

wherein said bead is about 3 mm to about 15 mm; and wherein said composition is removable after said composition is fully dry It is to be understood that the invention also provides embodiments that result from the combination of any of the embodiments disclosed herein or described in the Examples, unless such combination is mutually exclusive.

The invention is further illustrated by the following examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Several latex polymers were screened to determine removability in a sealant application. First, the latex polymers were flow coated on the substrate (either glass, coated paper (Leneta opacity chart), or painted wood (plywood painted with an interior flat paint)) and permitted to fully dry (generally no less than 24 hours). The dried substance was then visually inspected to determine if it formed a film. If the latex polymer formed a film, then it was further screened. It is noted that the compositions of the invention may be formed from latex polymers that do not form a film at typical room temperatures (about 10-35° C.), but they are generally not preferred.

Next, the dried films were peeled by hand from the substrate to determine if could be substantially removed in a single piece. If the film could be substantially removed in a single piece, it was further screened.

The dried films were visually inspected to color and clarity. It is preferred that the dried film is substantially clear and colorless, for aesthetic and safety reasons.

For those latex polymer compositions that passed the color, clarity, and peel tests, then the latex polymer was thickened. Since clear latex polymer sealants contain little or no filler, the ability of a latex polymer to respond to common thickeners is critical to developing a useful formulation, especially for sealants and other bead-forming applications. The following thickeners were screened:
  untreated fumed silica
  alkali swellable thickeners
  hydrophobically modified acrylic swellable emulsions (HASE)
  cellulosic thickeners
  synthetic clay thickeners Note: Natural clays were not screened due to color/clarity concerns.

Once it was demonstrated that the latex polymer composition could be thickened, the thickened system was applied to the three screening substrates and tested for removability after drying fully (usually 7 days). Success criteria: hand peel, no damage to substrate, little to no tearing of the bead.

The results of the screening tests are shown in the following table:

| Polymer | Comparative (C) or Invention (I) | Suitable for Clear? | Tg/MFFT* (° C.) | Hand peel from: Glass | Leneta card | Painted wood |
|---|---|---|---|---|---|---|
| Acrylic | I | yes | −29 | yes | Yes | yes |
| Acrylic | I | yes | −43 | yes | yes | yes |
| Acrylic (Latex Polymer 1) | I | yes | −25 | yes | yes | yes |
| Acrylic | C (Tg) | yes | −10 | yes | no | no |
| Acrylic | I | yes | −42 | yes | yes | yes |
| Acrylic | C (Tg) | yes | 15 (MFFT) | no | no | no |
| Acrylic | C (Tg) | yes | 20 (MFFT) | no | no | No |
| Acrylic/Acrylonitrile | I | No | −46 | yes | Yes | Yes |
| Polyvinyl butyral (contains 5% Butyl Ricinoleate) | C (contains plasticizer) | no | N/A | no | yes | no |
| Polyvinyl butyral + DINP | C (contains plasticizer) | no | N/A | yes | yes | yes |
| Styrene Butadiene | I | no | N/A | yes | yes | Yes |
| Styrene Butadiene | I | no | −35 | yes | yes | yes |
| Styrene Butadiene | C (not removable) | ~yes | −42 | no | no | no |
| Styrene Butadiene | C (not removable) | no | −35 | yes | no | no |
| Polyisoprene rubber | I | yes | ~−70 | yes | yes | yes |
| Styrene Acrylic | C (Tg) | yes | 18 | no | no | no |
| Styrene Acrylic w/ mineral oil | C (Tg and mineral oil) | ~yes | 20 | yes | no | no |
| Vinyl Acrylic | C (Tg) | yes | 19 | no | yes | no |
| Vinyl Acrylic | C (Tg) | ~yes | 10 | no | no | no |
| Vinyl Acrylic | C (Tg) | ~yes | 0 | no | no | no |

-continued

| Polymer | Comparative (C) or Invention (I) | Suitable for Clear? | Tg/MFFT* (° C.) | Hand peel from: Glass | Leneta card | Painted wood |
|---|---|---|---|---|---|---|
| VAE (surfactant stabilized) | C (Tg) | yes | 5 | yes | no | no |
| VAE | C (Tg) | ~yes | −4 | ~yes | no | no |
| Vinyl acetate-ethylene-acrylic | I | ~yes | −40 | yes | no | yes |
| Polyurethane | C (Tg) | yes | 42 (MFFT) | no | no | no |

*MFFT = minimum film-forming temperature (proxy for Tg; as reported by manufacturer)

Then the formula was optimized:
surfactants for stability (including freeze/thaw stability)
defoamers to reduce and help remove entrained air
UV protection/light stabilizers
glycols (such as ethylene glycol or propylene glycol) for freeze-thaw protection
biocide for in-can protection
Testing included:
Wet state properties, such as pH, extrusion (a measure of rheology) and slump;
Removal from various substrates (including glass, coated paper, painted wood, and sometimes coated aluminum flashing, painted hardwood trim (both interior flat and semi-gloss paint) and vinyl siding)
Stability after 5 freeze-thaw cycles and 4 weeks at 50° C. accelerated aging.
Accelerated weathering in the Atlas weatherometer for 200 hours.

Example 2

Latex Polymer 1 from Example 1 was applied in its undiluted state to substrates of increasing removal difficulty (Leneta opacity chart and painted wood). Latex Polymer 1 could be peeled by hand in substantially a single piece from the Leneta opacity chart and painted wood.

Example 3

Several latex polymers in a formulated sealant were tested for color/yellowness using the Datacolor spectrophotometer. A white standard was measured (coated paper "Leneta card" opacity chart.) The sealants were applied to the white card in a ⅛" thick patty. When fully dry, the color of the sealant was compared to the color of the white standard. CIE measurement is reported below (difference from the standard white card).

The results are shown in the following table:

|  | Δb (yellow/blue) (positive value is more yellow, negative value is more blue) | Is color visually acceptable (water white)? |
|---|---|---|
| Sealant Formulation containing Latex Polymer 1 (lot 1) | 1.10 | Yes |
| Sealant Formulation containing Latex Polymer 1 (lot 2) | 0.95 | Yes |
| Sealant Formulation containing Latex Polymer 1 (lot 3) | 0.37 | Yes |
| Comparative solvent-borne rubber based sealant (1) | −0.16 | Yes |
| Comparative solvent-borne rubber based sealant (2) | −0.08 | Yes |
| Clear Silicone Sealant | −0.69 | Yes |
| Comparative Commercial Latex Sealant (labeled removable but not removable when fully dry) | 4.88 | No |

Example 4

Several latex polymers in a formulated sealant were tested for clarity/haze using the Datacolor spectrophotometer. A black standard was measured (coated paper "Leneta card" opacity chart). The sealants were applied to the black card in a ⅛" thick patty. When fully dry, the color of the sealant was compared to the color of the black standard. CIE measurement is reported below (difference from the standard black card).

The results are shown in the following table:

|  | ΔL (light/dark) | Is haze visually acceptable (clear)? |
|---|---|---|
| Sealant Formulation containing Latex Polymer 1 (lot 1) | 15.65 | Yes |
| Sealant Formulation containing Latex Polymer 1 (lot 2) | 12.06 | Yes |
| Sealant Formulation containing Latex Polymer 1 (lot 3) | 18.32 | Yes |
| Comparative solvent-borne rubber based sealant (1) | −0.04 | Yes |
| Comparative solvent-borne rubber based sealant (2) | 0.87 | Yes |
| Clear Silicone Sealant | 34.75 | No |
| Comparative Commercial Latex Sealant (labeled removable but not removable when fully dry) | 21.17 | Yes |

Example 5

Several latex polymers were tested for peel strength using a Chatillon force gauge. Beads were peeled from painted wood (applied 2 weeks before removal) and glass (applied 6 months before removal). The width of the beads in contact with the substrate ranged from 0.25" to 0.38".

|  | Force to Remove (lbs/inch) | | | |
| --- | --- | --- | --- | --- |
|  | Flat Painted Wood | Semi-gloss paint wood | Glass | Comment |
| Sealant Formulation containing Latex Polymer 1 | 8.0-10.0 | 6.6-8.3 | 5.8-9.1 | Removable; no residue |
| Comparative Commercial Latex Clear Permanent Sealant | — | — | Not tested | Failed cohesively; non-removable |
| Comparative Commercial Latex Sealant (labeled removable but not removable when fully dry) | — | — | Peeled but left oily residue on glass | Failed cohesively; non-removable to painted wood. Failed due to oily residue on glass |

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as temperature ranges and pressure ranges, or chemical properties, such as chemical formulae, all combinations, and sub-combinations of ranges and specific embodiments therein are intended to be included.

The disclosures of each patent, patent application, and publication cited or described in this document are hereby incorporated herein by reference, in their entirety.

What is claimed is:

1. A composition comprising:
   a copolymer comprising:
      about 40% by weight to about 95% by weight, based on the total weight of said copolymer, of butyl acrylate;
      about 0.2% by weight to about 10% by weight, based on the total weight of said copolymer, of (meth) acrylic acid;
      about 2% by weight to about 40% by weight, based on the total weight of said copolymer, of methyl methacrylate; and
      optionally, ethylhexyl acrylate;
      wherein the copolymer has an average particle diameter from 30 nanometers to 400 nanometers;
      wherein said copolymer has a glass transition temperature of −35° C. to −20° C. and a weight-average molecular weight of at least 35,000 Daltons;
   optionally, at least one crosslinking agent;
   a thickener;
   water; and
   about 1% by weight to less than about 5% by weight, based on the total weight of said composition, of organic solvent, wherein the organic solvent comprises ethylene glycol or propylene glycol;
   less than about 1% by weight, based on the total weight of said composition, of release agents selected from the group consisting of oil, plasticizer, and mixtures thereof; and
   wherein said composition is a removable sealant composition and is removable after said composition is fully dry,
   wherein the composition has a peel strength of 0.45 to 10.0 lbs/inch,
   wherein the composition exhibits substantially 100% interfacial failure, and
   wherein the composition has a solids content of from about 10% to about 85% by volume and a viscosity effective to produce a bead.

2. A composition of claim 1, wherein said copolymer is crosslinkable or crosslinked.

3. A composition of claim 1, wherein said copolymer is not a light-cured thermosetting polymer.

4. A composition of claim 1, wherein said copolymer has a weight-average molecular weight of about 50,000 Daltons to about 1,000,000 Daltons.

5. A composition of claim 1, wherein said crosslinking agent is present; and wherein said crosslinking agent is an aziridine, an isocyanate, or a carbodiimide.

6. A composition of claim 1, wherein said crosslinking agent is present and is an external crosslinker; wherein said external crosslinker is present at a level of about 1% by weight to about 5% by weight, based on weight of copolymer solids.

7. A composition of claim 1, further comprising: at least one additive selected from the group consisting of:
   rheology modifier;
   light stabilizer;
   surfactant;
   base for pH adjustment;
   biocide;
   anti-freeze agent;
   antifoaming agent; and
   fire retardant.

8. A composition of claim 1, wherein said composition is removable for at least about one month after application to a substrate.

9. A composition of claim 1, wherein said composition is removable for at least about twelve months after application to a substrate.

10. A dried sealant, comprising the removable sealant composition of claim 1, wherein said dried sealant is substantially clear.

11. A method of removably sealing a gap between at least two substrates, comprising:
   applying said composition of claim 1 to said gap; and
   permitting said composition to dry;
   wherein said gap is about 3 mm to about 15 mm; and
   wherein said composition is removable after said composition is fully dry.

12. A method of forming a removable bead on a substrate, comprising:
   applying a bead of said composition of claim 1 to said substrate; and
   permitting said composition to dry;
   wherein said bead is about 3 mm to about 15 mm; and
   wherein said composition is removable after said composition is fully dry.

13. A composition of claim 1, wherein said copolymer has an average particle diameter from 250 nanometers to 400 nanometers.

14. A composition of claim 1, wherein said copolymer is present in the composition at a level of about 30% by weight to about 99% by weight, based on the weight of the composition before drying.

15. A sealant composition consisting of:
   a copolymer comprising:
      about 40% by weight to about 95% by weight, based on the total weight of said copolymer, of butyl acrylate;
      about 0.2% by weight to about 10% by weight, based on the total weight of said copolymer, of (meth)acrylic acid; and
      about 2% by weight to about 40% by weight, based on the total weight of said copolymer, of methyl methacrylate;
   wherein the copolymer has an average particle diameter from 30 nanometers to 400 nanometers;
   wherein said copolymer has a glass transition temperature of −35° C. to −20° C. and a weight-average molecular weight of at least 35,000 Daltons;
   a thickener;
   water;
   about 3% by weight to less than about 5% by weight, based on the total weight of said composition, of organic solvent, wherein the organic solvent comprises ethylene glycol or propylene glycol; and
   at least one additive selected from the group consisting of: rheology modifier; light stabilizer; surfactant; base for pH adjustment; biocide; antifoaming agent; and fire retardant;
   wherein said composition is a removable sealant composition and is removable after said composition is fully dry,
   wherein the composition has a peel strength of 0.45 to 10.0 lbs/inch, and
   wherein the composition exhibits substantially 100% interfacial failure.

16. A composition of claim 1, wherein the thickener is selected from the group consisting of untreated fumed silica, alkali swellable thickeners, hydrophobically modified acrylic swellable emulsions, cellulosic thickeners, and synthetic clay thickeners.

17. A composition of claim 1, wherein the organic solvent is present in an amount of from about 3% by weight to less than about 5% by weight, based on the total weight of said composition.

18. A composition of claim 1, wherein the copolymer comprises:
   about 60% by weight to about 80% by weight, based on the total weight of said copolymer, of butyl acrylate;
   about 0.5% by weight to about 5% by weight, based on the total weight of said copolymer, of (meth)acrylic acid; and
   about 20% by weight to about 35% by weight, based on the total weight of said polymer, of methyl methacrylate.

19. A composition of claim 15, wherein the copolymer comprises:
   about 60% by weight to about 80% by weight, based on the total weight of said copolymer, of butyl acrylate;
   about 0.5% by weight to about 5% by weight, based on the total weight of said copolymer, of (meth)acrylic acid; and
   about 20% by weight to about 35% by weight, based on the total weight of said polymer, of methyl methacrylate.

* * * * *